United States Patent
Huang et al.

(10) Patent No.: US 7,273,315 B2
(45) Date of Patent: Sep. 25, 2007

(54) MIXING DEVICE WITH VARIABLE SPEED DRIVE AND RELATED CONTROL FEATURES

(75) Inventors: Joseph C. Huang, Dayton, OH (US); Brian E. Bader, Springfield, OH (US); Howard A. Hartley, Jr., Brookville, OH (US)

(73) Assignee: Premark Feg LLC, Wilmington, DE (US)

( * ) Notice: Subject to any disclaimer, the term of this patent is extended or adjusted under 35 U.S.C. 154(b) by 197 days.

(21) Appl. No.: 10/842,369

(22) Filed: May 10, 2004

(65) Prior Publication Data

US 2004/0208082 A1 Oct. 21, 2004

Related U.S. Application Data

(63) Continuation-in-part of application No. 10/329,040, filed on Dec. 23, 2002.

(51) Int. Cl.
*B01F 7/30* (2006.01)
*B01F 15/00* (2006.01)

(52) U.S. Cl. .................................. 366/206; 366/601

(58) Field of Classification Search ............ 366/96–98, 366/199–207, 288, 601; 99/348
See application file for complete search history.

(56) References Cited

U.S. PATENT DOCUMENTS

| | | | |
|---|---|---|---|
| 1,767,002 A | 6/1930 | Meeker et al. | |
| 1,781,321 A * | 11/1930 | Dehuff | 474/31 |
| 2,019,911 A * | 11/1935 | Meeker et al. | 366/288 |
| 2,181,079 A * | 11/1939 | Dehuff | 366/207 |
| 2,185,155 A | 12/1939 | Meeker et al. | |
| 2,251,903 A | 8/1941 | Anstice et al. | |
| 2,616,673 A | 11/1952 | Van Guilder | |
| 3,422,330 A | 1/1969 | Swanke | |
| 3,951,351 A * | 4/1976 | Ernster et al. | 241/101.1 |
| 4,568,193 A | 2/1986 | Contri et al. | |
| 4,697,929 A | 10/1987 | Muller | |
| 4,819,460 A | 4/1989 | Obradovic | |
| 4,822,172 A * | 4/1989 | Stottmann | 366/142 |
| 4,860,816 A * | 8/1989 | Bond | 164/155.3 |
| 4,893,942 A * | 1/1990 | Stottmann | 366/279 |
| 5,000,578 A | 3/1991 | Artin et al. | |

(Continued)

FOREIGN PATENT DOCUMENTS

CH 691103 A5 * 4/2001

(Continued)

OTHER PUBLICATIONS

Service manual entitled "Models H-600 and H-600-T and L-800 Mixers," by Hobart Corporation (Sep. 1977).

(Continued)

*Primary Examiner*—Charles E. Cooley
(74) *Attorney, Agent, or Firm*—Thompson Hine LLP

(57) ABSTRACT

A mixing machine includes a drive assembly and control system for making speed changes on the fly and for providing controlled acceleration and deceleration. A bowl receiving portion may be movable between a lowered position and a raised position with a power bowl lift mechanism provided to effect such movement. Advanced control features and special function modes may also be provided.

7 Claims, 9 Drawing Sheets

U.S. PATENT DOCUMENTS

| | | | |
|---|---|---|---|
| 5,087,864 A * | 2/1992 | Abel | 318/34 |
| 5,140,248 A * | 8/1992 | Rowan et al. | 318/811 |
| 5,204,606 A * | 4/1993 | Kuwahara et al. | 318/800 |
| 5,306,083 A | 4/1994 | Caldwell et al. | |
| 5,348,393 A | 9/1994 | Pappas, Jr. | |
| 5,472,276 A | 12/1995 | Ratermann et al. | |
| 5,547,278 A | 8/1996 | Xie | |
| 5,570,955 A | 11/1996 | Swartwout et al. | |
| 5,653,535 A * | 8/1997 | Xie et al. | 366/100 |
| 5,690,427 A * | 11/1997 | Jennings | 366/100 |
| 5,736,828 A | 4/1998 | Turner et al. | |
| 5,844,343 A | 12/1998 | Horst | |
| 5,872,435 A | 2/1999 | Bolte et al. | |
| 5,906,432 A | 5/1999 | Wade et al. | |
| 5,934,802 A * | 8/1999 | Xie | 366/100 |
| 5,955,861 A | 9/1999 | Jeong et al. | |
| 5,957,021 A | 9/1999 | Meredith et al. | |
| 6,066,074 A | 5/2000 | Marcinkiewicz | |
| 6,313,597 B1 | 11/2001 | Elliott et al. | |
| 6,429,612 B1 * | 8/2002 | Kume et al. | 318/139 |
| 6,638,122 B1 | 10/2003 | Griffith, Sr. | |
| 6,704,212 B2 * | 3/2004 | Furukawa et al. | 363/41 |
| D490,271 S | 5/2004 | Short et al. | |
| 6,750,629 B2 * | 6/2004 | Shigemizu et al. | 318/801 |
| 6,756,757 B2 | 6/2004 | Marcinkiewicz et al. | |
| 6,883,959 B2 * | 4/2005 | Donthnier et al. | 366/203 |
| 6,953,278 B2 * | 10/2005 | Short et al. | 366/206 |
| 6,972,541 B2 * | 12/2005 | Matsushiro et al. | 318/801 |
| 7,005,825 B2 * | 2/2006 | Eguchi | 318/727 |
| 7,014,354 B2 * | 3/2006 | Donthnier et al. | 366/203 |
| 2002/0093877 A1 | 7/2002 | Brunswick et al. | |
| 2003/0165068 A1 * | 9/2003 | Tomonaga | 363/37 |
| 2004/0008005 A1 * | 1/2004 | Sakai et al. | 318/801 |
| 2004/0120213 A1 * | 6/2004 | Short et al. | 366/197 |
| 2004/0120215 A1 * | 6/2004 | Huang et al. | 366/203 |
| 2004/0208082 A1 * | 10/2004 | Huang et al. | 366/206 |
| 2005/0122836 A1 | 6/2005 | Boyle et al. | |
| 2005/0141340 A1 * | 6/2005 | Donthnier et al. | 366/207 |

FOREIGN PATENT DOCUMENTS

| | | |
|---|---|---|
| DE | 3613231 A | 10/1987 |
| DE | 3912361 A1 * | 10/1990 |
| EP | 0293915 | 12/1988 |
| EP | 710442 A2 * | 5/1996 |
| EP | 1130761 | 9/2001 |
| EP | 1433382 | 6/2004 |
| FR | 2805177 * | 8/2001 |
| GB | 2134674 A | 8/1984 |
| JP | 11114394 | 4/1999 |

OTHER PUBLICATIONS

Instruction manual entitled "H600 & L800 Mixers," by Hobart Corporation (Dec. 1999).

The Characteristics, Design and Applications of Switched Reluctance Motors and Drives, Dr. J.M. Stephenson and Dr. R.J. Blake, 68 pages.

* cited by examiner

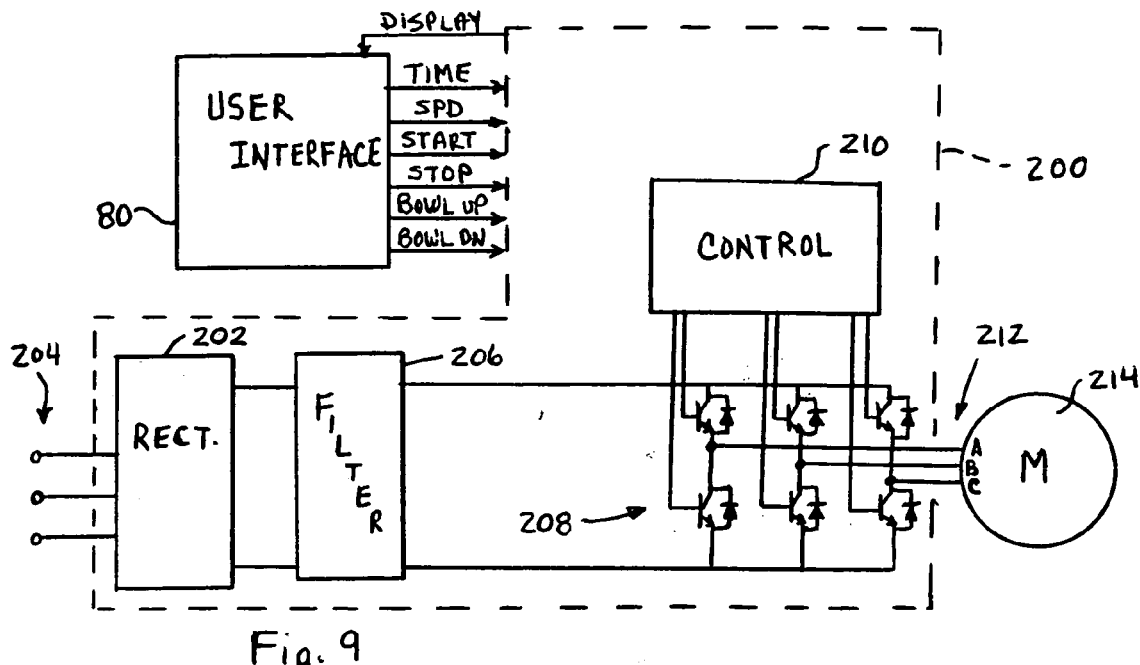
Fig. 9
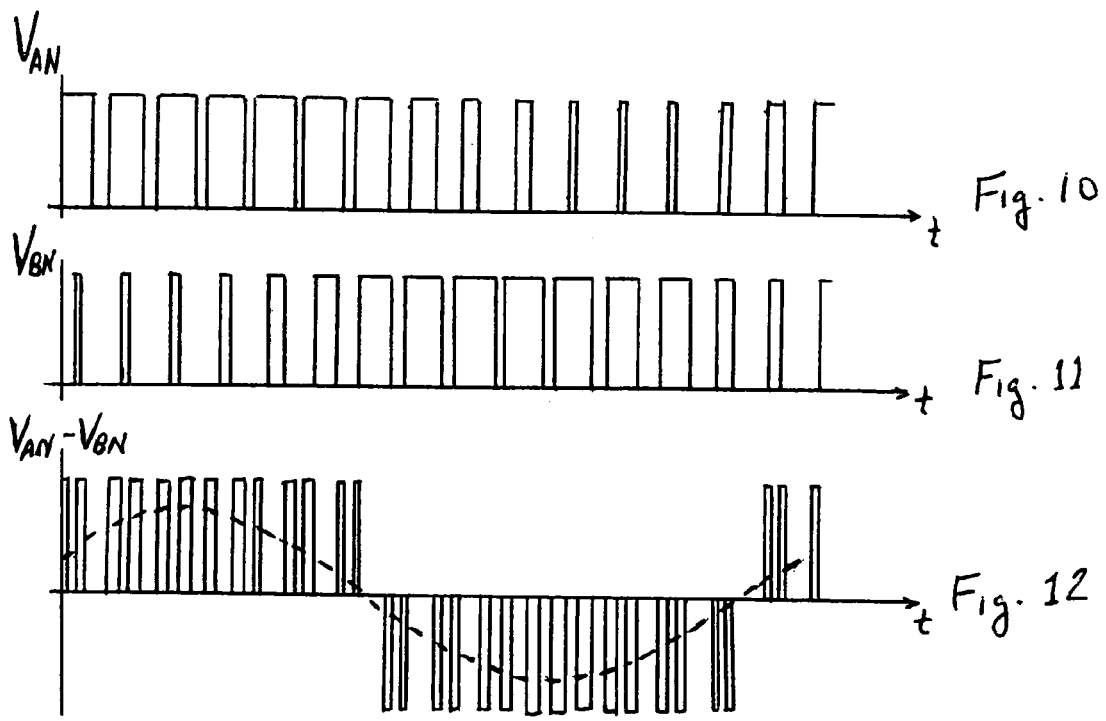
Fig. 10
Fig. 11
Fig. 12

MIXING DEVICE WITH VARIABLE SPEED DRIVE AND RELATED CONTROL FEATURES

CROSS-REFERENCE TO RELATED APPLICATION

This application is a continuation-in-part of application Ser. No. 10/329,040 filed Dec. 23, 2002, the entire specification of which is incorporated herein by reference.

TECHNICAL FIELD

The present application relates generally to commercial mixers utilized for mixing food products such as dough, and more particularly to a commercial mixer with a variable speed drive and desirable control features.

BACKGROUND

It is known in existing commercial mixers to provide multiple speed settings for the mixers. The various available mixing speeds are primarily driven by a motor through combinations of gears and/or belts and/or variable adjustable pulleys, where mechanical adjustments are made to change mix speeds. Many such devices require that the mixer be stopped in order to change speeds.

U.S. Pat. No. 5,934,802 is representative of a mixer that did not utilize mechanical adjustment of any drive linkage or gear system to change speeds, but instead simply adjusted the output speed of a DC motor. However, control of the DC motor was implemented in a relatively simple manner, using a potentiometric speed control switch to adjust a PWM signal delivered to the motor. No feedback of motor speed was provided. In larger commercial mixers, use of a DC motor is impractical due to the size of the DC motor needed to provide sufficient torque.

Accordingly, it would be advantageous to provide a mixer that can change speeds on the fly and provide sufficient torque for commercial mixing applications.

SUMMARY

In one aspect, a mixing machine includes a head extending over a bowl receiving location, the head including a rotatable output member for receiving a mixer tool. A drive assembly includes a drive motor and a drive linkage operatively connected to effect rotation of the rotatable output member. A user interface includes at least one input mechanism and a control system receives input from the user interface and is connected for controlling operation of the drive motor to provide closed loop control of motor speed and acceleration to effect mix speed changes on the fly solely by adjusting motor speed.

In another aspect, a mixing machine includes a head extending over a bowl receiving location, the head including a rotatable output member for receiving a mixer tool and a gear system therewithin for effecting rotation of the rotatable output member. A switched reluctance motor has an output operatively connected to drive the gear system. A switched reluctance drive operates the switched reluctance motor. A user interface includes at least one input mechanism and a control unit receives input from the user interface and is connected for controlling operation of the switched reluctance drive.

In a further aspect, a mixing machine includes a head including a rotatable output member for receiving a mixer tool. A mixer body supports the head and includes a bowl receiving portion, the bowl receiving portion mounted for movement between a lowered position away from the head and a raised position toward the head. A power bowl lift mechanism is provided for moving the bowl receiving portion between the lowered position and the raised position. At least one sensor detects when the bowl receiving portion is in the raised position. A drive assembly is provided for effecting rotation of the rotatable output member. A first user input mechanism is provided for initiating mixing and a second user input mechanism is provided for activating the power bowl lift mechanism. A control system receives input from each of the first user input mechanism, the second user input mechanism and the sensor, and controls both the power bowl lift mechanism and the drive assembly. The control system includes a plurality of speed settings for the drive assembly. In response to the first input mechanism being actuated to initiate a mixing operation at a first speed setting when the bowl receiving portion is below the raised position, the control system operates to activate the drive assembly at a slow speed which is less than the first speed setting.

In yet another aspect, a mixing machine includes a rotatable output member positioned over a bowl receiving area and a drive assembly connected for effecting rotation of the rotatable output member. At least one user input mechanism is provided and a control system receives inputs from the user input mechanism. The control system includes memory storing a plurality of operating settings and has at least one special function mode enabling at least one of the operating settings to be changed. The control system is placed in the special function mode by receiving a predetermined sequence of inputs from the at least one user input mechanism.

In another aspect, a mixing machine includes a rotatable output member positioned over a bowl receiving area and a drive assembly connected for effecting rotation of the rotatable output member. A user interface includes at least a speed selection mechanism for selecting one of multiple speed levels. A control system receives input from the speed selection mechanism and effects operation of the drive assembly, the control system including memory storing a first plurality of speed settings corresponding to a first mixer configuration and a second plurality of speed settings corresponding to a second mixer configuration. Only one of the first plurality of speed settings or the second plurality of speed settings is active at any given time.

BRIEF DESCRIPTION OF THE DRAWINGS

FIG. 9 is a control system schematic of a mixer system with a variable frequency drive.

FIGS. 10 and 11 depict exemplary PWM voltage signals of varying duty cycles delivered to respective motor terminals.

FIG. 12 depicts the exemplary effective voltage seen by the motor terminals based upon the PWM voltage signals of FIGS. 10 and 11.

DETAILED DESCRIPTION

Figure 1:
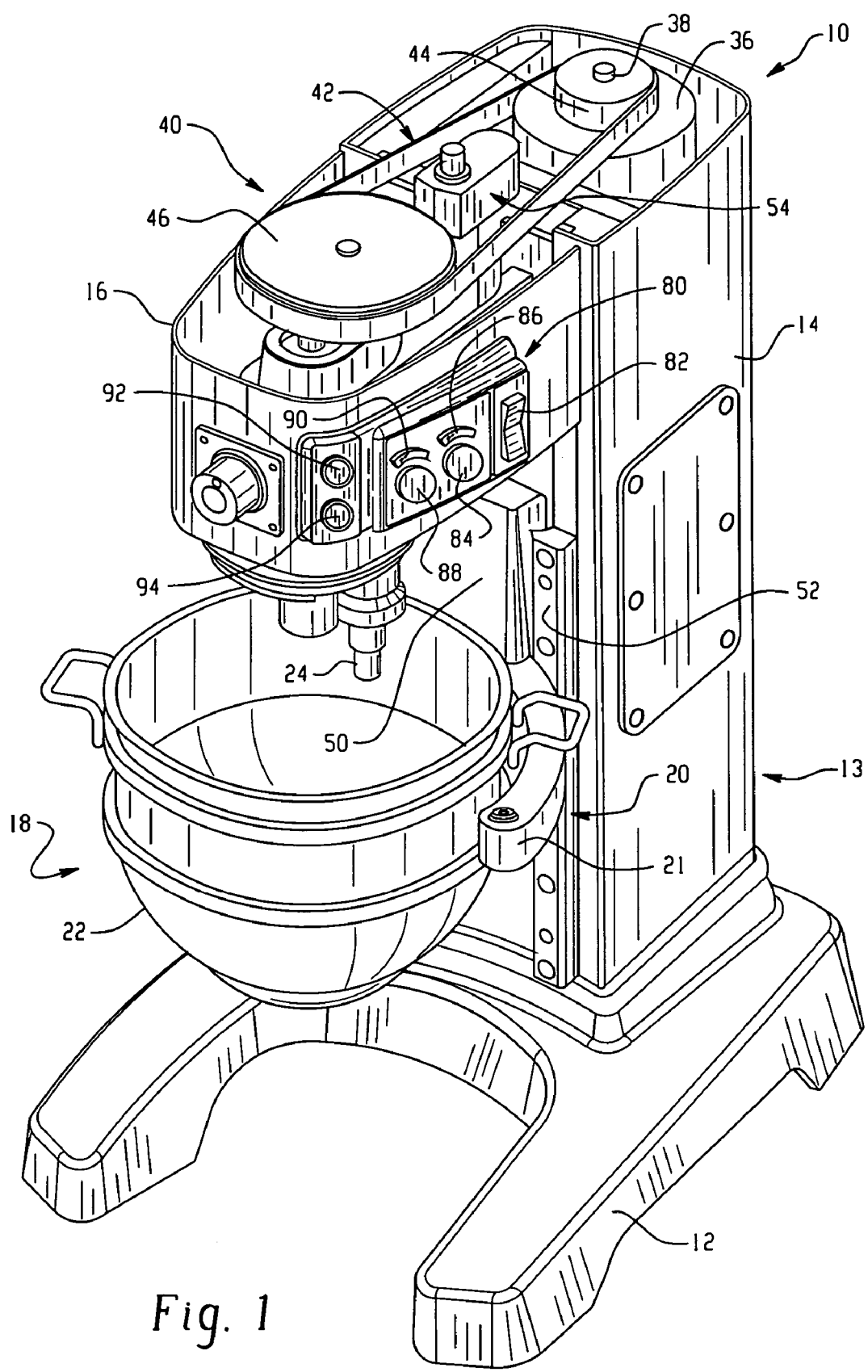
FIG. 1 is a perspective view of a mixing machine with top cover removed.
Figure 2:
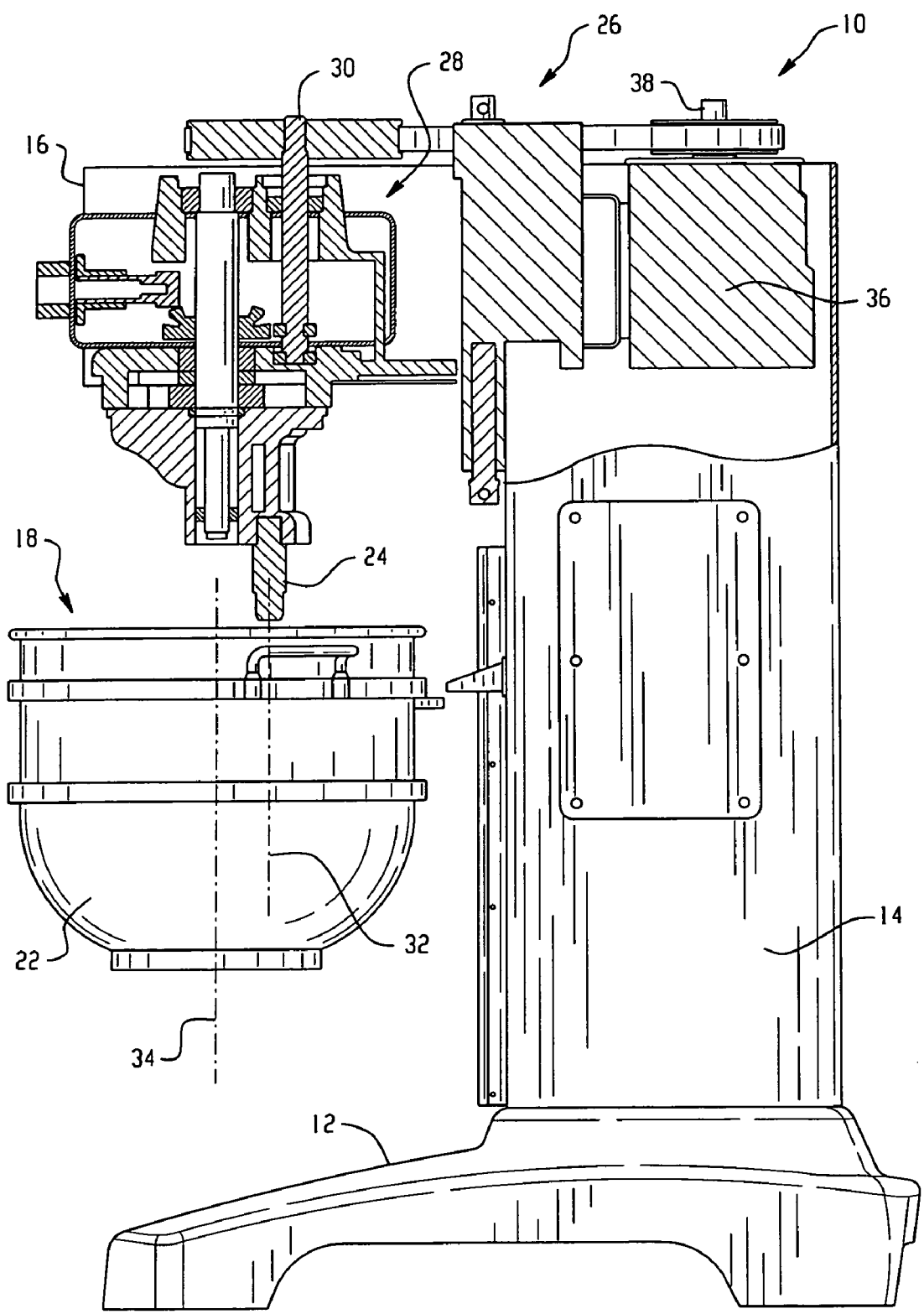
FIG. 2 is a side elevation of the mixing machine of FIG. 1 in partial cross-section.
Figure 3:
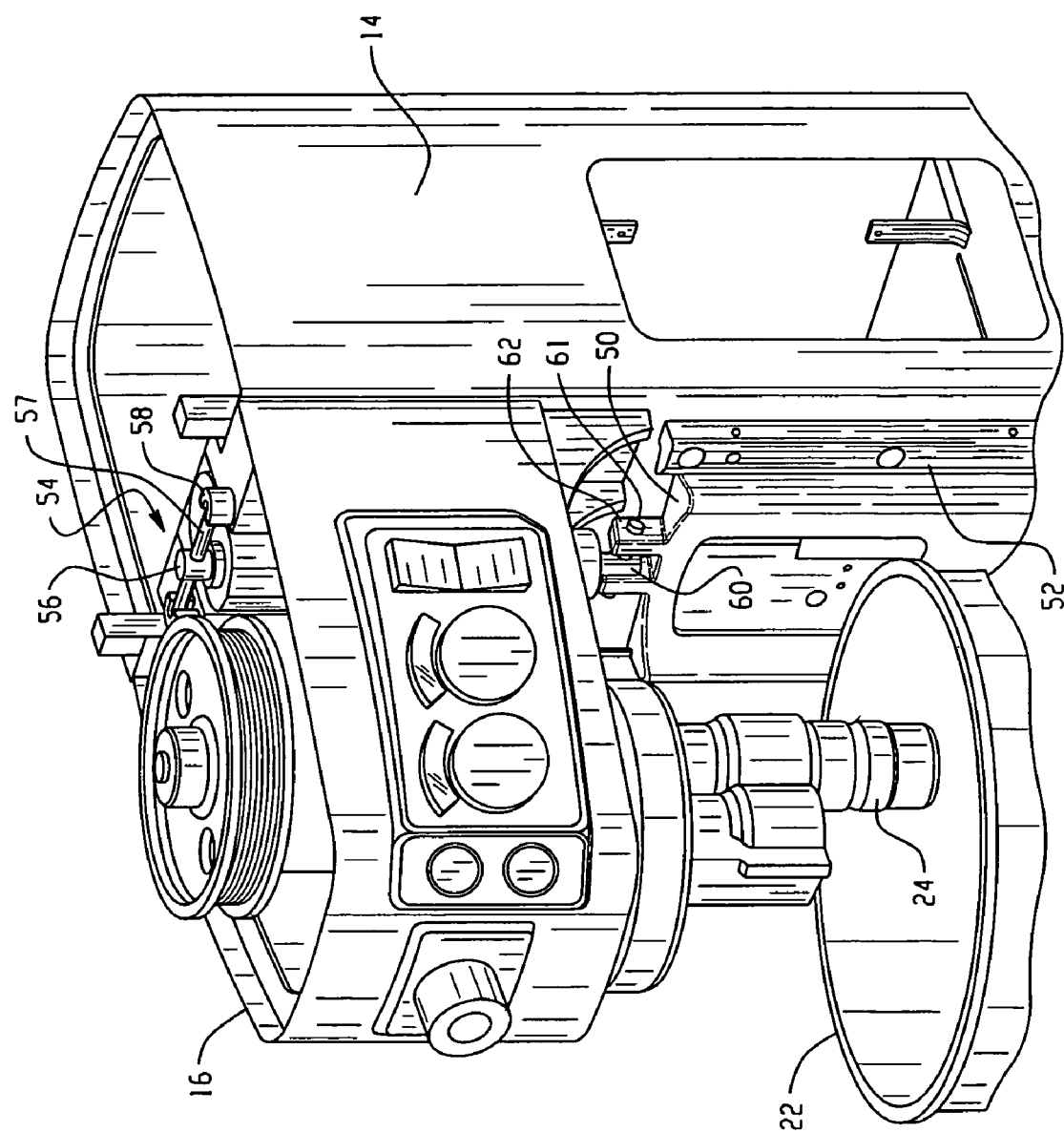
FIG. 3 is a perspective view of an upper portion of the mixing machine of FIG. 1.

Referring to FIGS. 1-3, a mixing machine 10 is shown and includes a base 12, a mixer body 13 including a column 14 extending upward from the base 10, and a head 16 extending outward from the column 14 and over a bowl receiving location 18. The bowl receiving location 18 may be defined by a bowl receiving portion 20 of the mixer body 13, where the bowl receiving portion 20 has a spaced apart curved arms 21 defining a curved shape to match the bowl 22. The head includes a downwardly extending rotatable output member 24 that can receive a mixer tool such as dough hook, whisk or other tool. The head 16 and upper portion of the column 14 typically include a detachable cover (not shown) for enclosing the components.

The mixing machine includes a drive assembly 26 for effecting rotation of the rotatable output member 24. In the illustrated machine the drive assembly is formed in part by a gear system 28 within the head 16 and having an upwardly extending input drive shaft 30. In the case of a planetary mixer, the gear system 28 may take the form of a planetary gear system, in which case the rotatable output member 24 rotates about its own axis 32, with the axis 32 orbiting around a central bowl axis 34 during mixing operations. Also forming part of the drive assembly is a drive motor 36 that is mounted and located in line with the column 14 and includes an upwardly extending output shaft 38. A drive linkage 40 connects the motor output shaft 38 to the gear system input shaft 30 and may be formed by the illustrated belt 42 and pulleys 44 and 46. Alternative drive linkages could take the form of chain and sprocket combinations, additional gearing and/or or bar-type linkages. The illustrated drive linkage 40 is a fixed linkage, meaning that the drive ratio between the motor output shaft 38 and the gear system input shaft 30 does not change.

The bowl receiving portion 20 may be mounted for movement between a raised position toward the head 16 and a lowered position away from the head 16, the raised position being used during mixing operations and the lowered position being used for bowl installation and removal as well as for installation and removal of mixing tools on the rotatable output member 24. In this regard, the curved arms 21 of the bowl receiving portion 20 connect with a central support 50 and the support 50 rides upward and downward on a pair of spaced apart guide rails 52 on the front side of the column 14. A power lift mechanism 54, such as a linear actuator, may be provided for effecting upward and downward movement of the bowl receiving portion 20. In one embodiment, a suitable linear actuator is the Warner Electric DC24-10A5 series DC motor 8" stroke length gear train and ACME screw actuator. Alternatively, other types of power lift mechanisms could be used, or a manual mechanism controlled by a crank handle could be used. Where a linear actuator is used as shown, a top portion 56 may be secured to mounts 58 unitary with an internal casting of the head, and a lower moving rod portion 60 may be connected to mounts 62 on the support 50 as shown in FIG. 3.

In one embodiment, a switched reluctance motor is provided as the drive motor 36. A switched reluctance motor is desirable because it can provide high torque at low operating speeds, such as those often used in mixing applications for planetary mixers. In another embodiment, an AC induction motor might be used.

Figure 4:
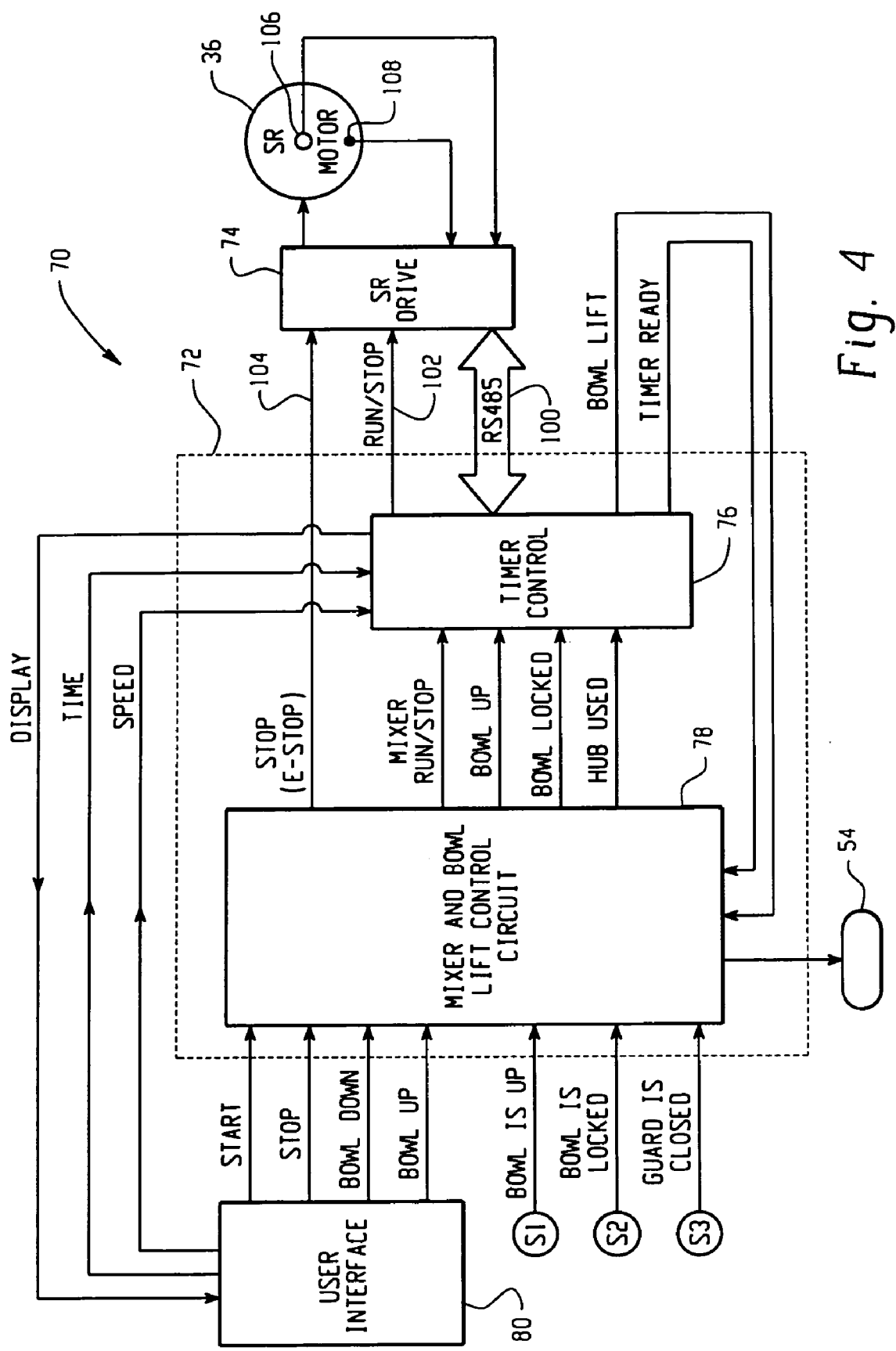
FIG. 4 is a control system schematic for the mixing machine of FIG. 1.

Referring to FIG. 4, an exemplary control arrangement for a switched reluctance motor embodiment is shown and includes a control system 70 formed by a control unit 72 and a switched reluctance ("SR") drive 74. The control unit 72 includes a processor or microcontroller based timer control unit 76 and an analog control circuit 78. A user interface 80 enables a user to input desired operations to the control unit 72, and a plurality of sensors S1, S2, and S3 are also connected with the control unit 72 and indicate the status of various parts of the mixer as will be described in more detail below. In an embodiment using an AC induction motor, a variable frequency AC drive could be used in place of the SR drive 74.

Figure 5:
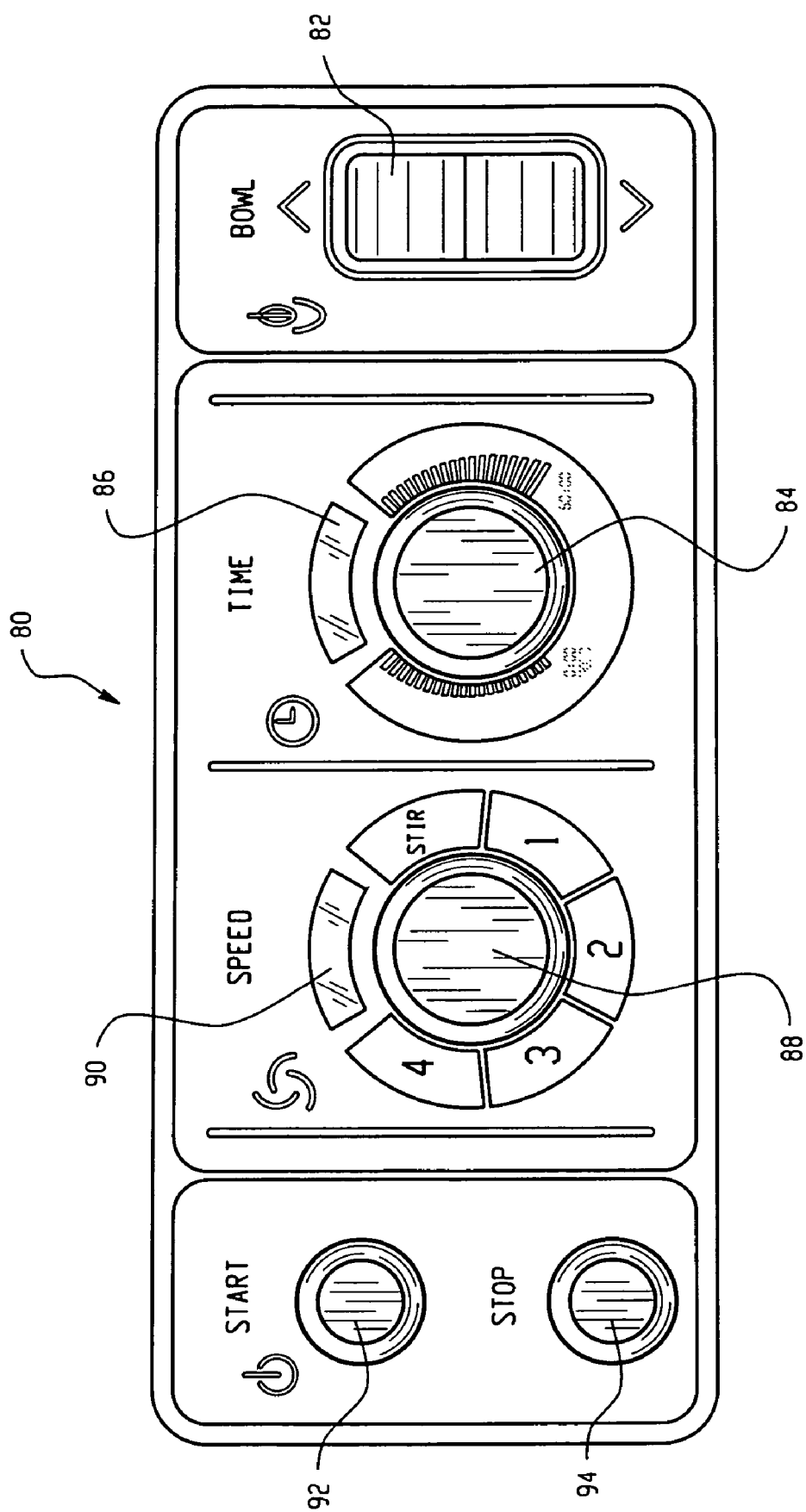
FIG. 5 illustrates the user interface of the mixing machine of FIG. 1.

Referring again to FIGS. 1 and 5, an exemplary user interface 80 is located on the head 16 and includes a plurality of input mechanisms including a bowl up/down switch 82 for activating the power bowl lift mechanism 54, a time input mechanism 84 and associated LED display 86 for inputting a desired mix time, a speed input mechanism 88 and associated LED display 90 for inputting a desired mix speed, a mix start button 92 and a mix stop button 94. It is recognized that display types other than LED could also be used. Referring to FIGS. 1 and 4, the bowl up/down switch 82 may be a double-pole double-throw switch that closes a forward power path in the analog control circuit 78 when depressed in one direction (e.g., upward for BOWL UP) and closes a reverse power path in the analog control circuit 78 when depressed in the other direction (e.g., downward for BOWL DOWN), with both power paths of the analog control circuit 78 delivering power to the power lift mechanism 54 for initiating either up or down movement as may be desired. The time input mechanism 84 may be a rotating knob connected to a bi-directional rotary encoder that outputs pulses directly to the timer control 76 via the signal path labeled TIME. The timer control 76 responsively drives the LED display 86 to reflect the selected/changing mix time (e.g., in minutes and seconds). The speed input mechanism 88 may be a rotating knob connected to a six-position switch such as a Carling switch providing inputs to the timer control 76 via the signal path labeled SPEED. The timer control 76 responsively drives the LED display 90 to reflect the selected speed (e.g., Stir, 1, 2, 3, 4). Of course, in the case of each input mechanism it is contemplated that other types of devices could be used. It is also contemplated that more or less input mechanisms could be provided.

The mix start button 92 may be a normally-open pushbutton switch connected in the analog control circuit 78 and the mix stop button 94 may be a normally-closed pushbutton switch connected in the analog control circuit 78. 51 While numerous types of sensors could be used, in a simple form the sensors S1, S2, and S3 may be limit switches incorporated in the analog control circuit 78 that open or close one or more signal or power paths based upon monitored mixer parts. For example, relative to FIG. 4, sensor switch S1 may be located to close only when the bowl receiving portion 20 moves to its raised position (e.g., BOWL IS UP), sensor switch S2 could be located to close only when a mixer bowl is placed in an operating position relative to the bowl receiving portion 20 (e.g., BOWL IS LOCKED) and sensor switch S3 may be located to close only when a bowl guard positioned between the bowl 22 and the head 16 is in its closed position (e.g, GUARD IS CLOSED). In this regard, the user interface 80 could be provided with one LED or other controllable visual indicator for indicating when the bowl is in the raised position, another LED or other controllable visual indicator for indicating when the bowl is in the operating position and/or another LED or other controllable visual indicator for indicating when the bowl guard is closed.

With respect to the bowl up sensor switch S1, a limit switch can be located toward the front portion of column 14 to be contacted by an upper portion of the control support 50 when the bowl receiving portion 20 is moved to the raised position.

Figure 6:
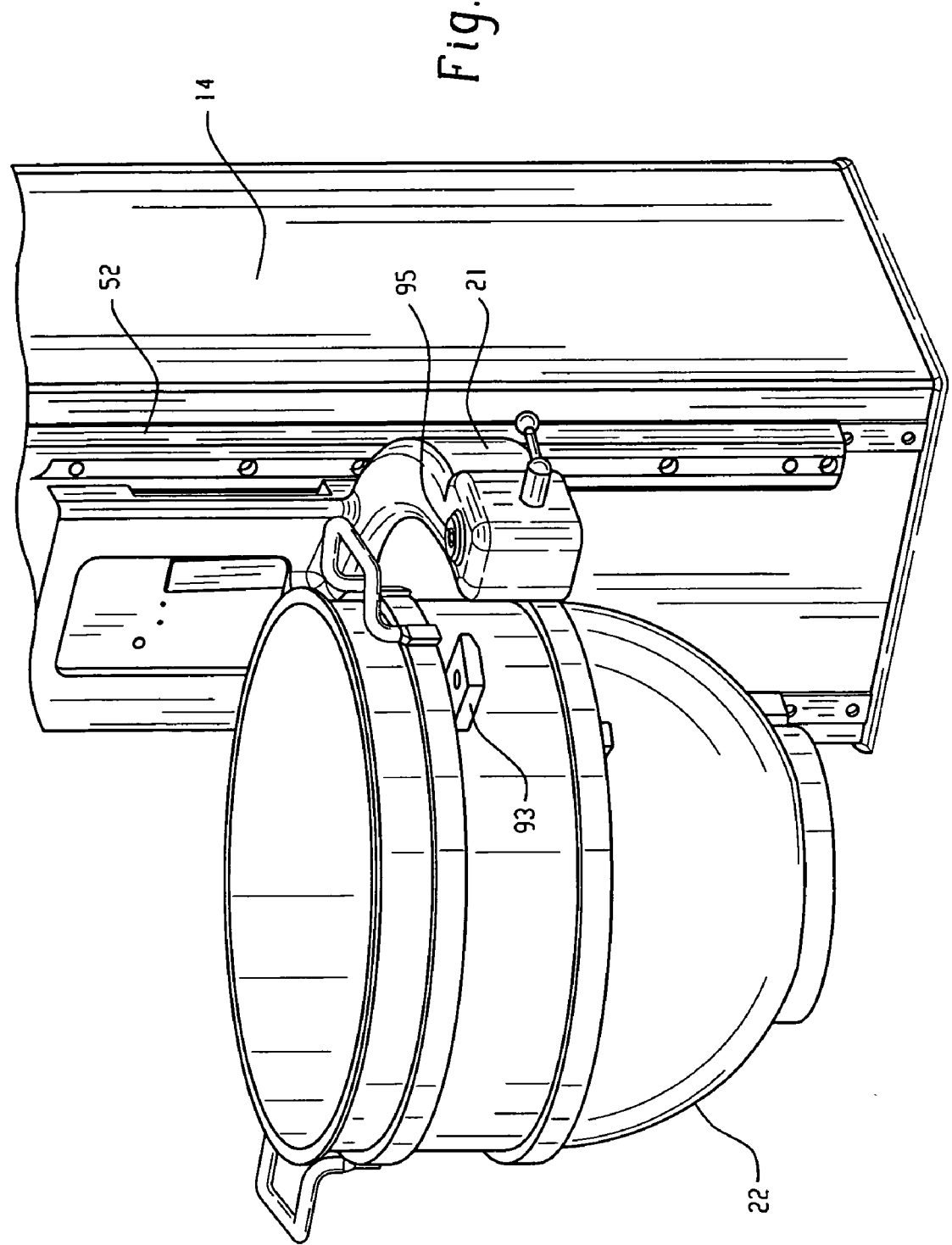
FIGS. 6 and 7 illustrate one embodiment of a pivotal bowl mounting system.
Figure 7:
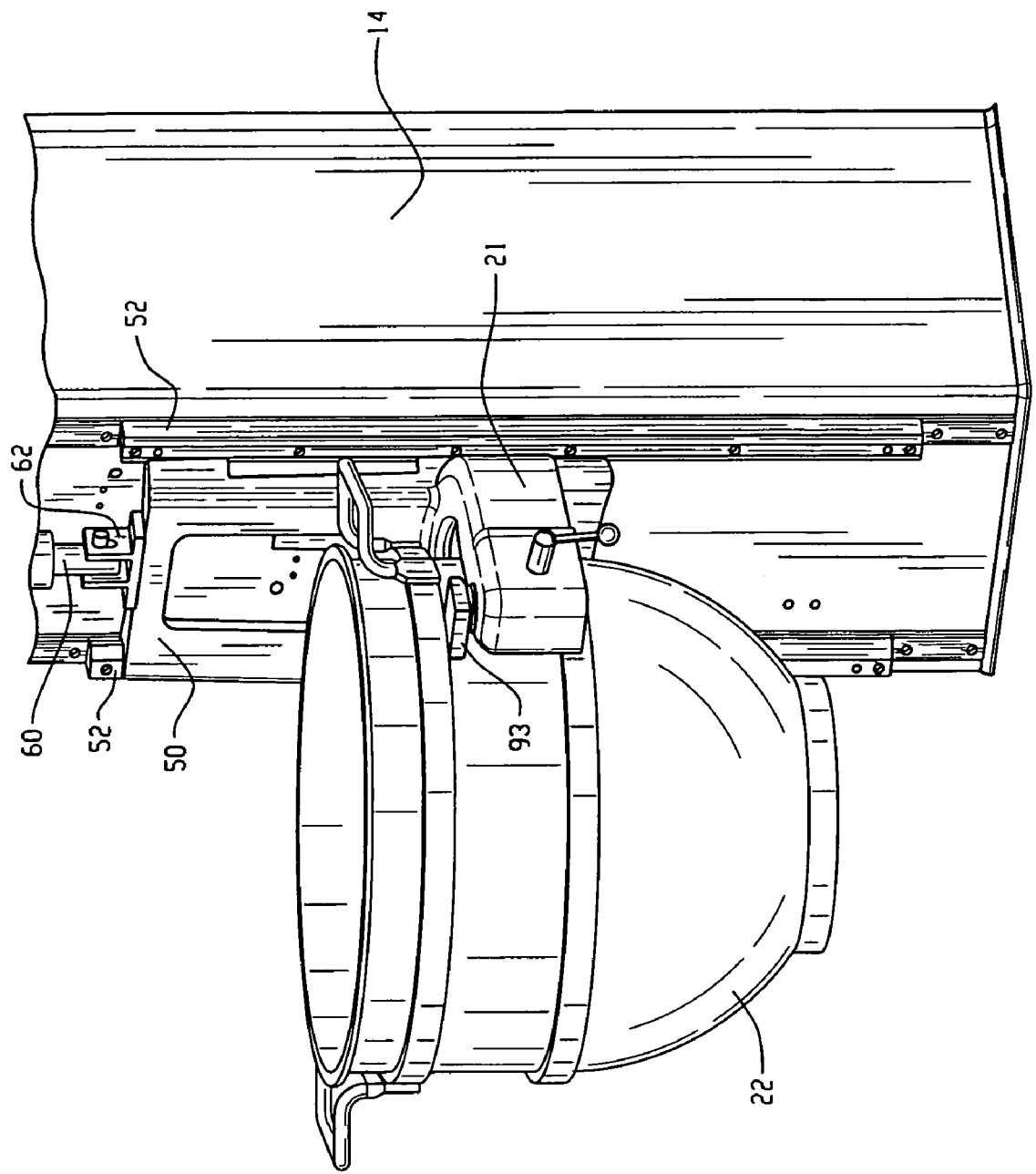

With respect to the bowl locked sensor switch S2, in one embodiment the bowl 22 may be pivotally mounted at one side to the bowl receiving portion 20 to move between a non-operating position (FIG. 6) and an operating position (FIG. 7). The pivotal mount may be achieved by a combination of pins on the bowl receiving portion 20 and bracket openings on the bowl 22 that engage each other to form a hinge. The bowl 22 is held in the operating position by a locking bracket 93 that couples with a retractable pin 95 that is spring-biased in an upward position. When the bowl 22 is in the closed, operating position a portion of the bowl 22 actuates a switch plate assembly toward the front portion of the column 14 to close the sensor switch S2 behind the switch plate. Further details of such pivoting bowl arrangements are provided in U.S. patent application Publication No. U.S. 2002/0,093,877 A1, published Jul. 18, 2002. Other sensor configurations could be used, inclusive of mixers where the bowl 20 is not pivotally mounted to the bowl receiving portion, in which case the switch could simply detect whether or not the bowl 20 has been loaded onto the bowl receiving portion 20.

Figure 8:
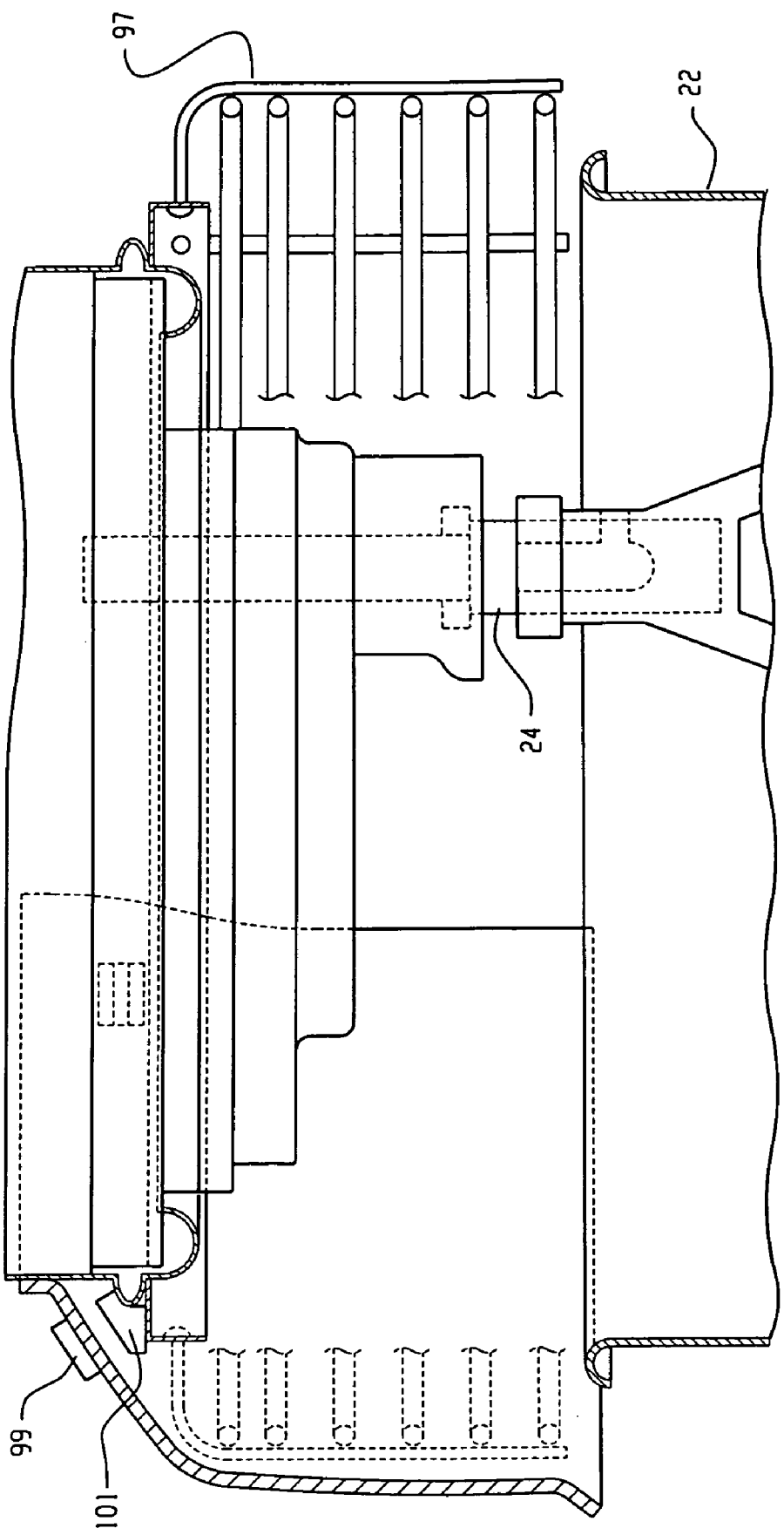
FIG. 8 shows one embodiment of a bowl guard assembly.

With respect to the bowl guard closed sensor switch S3, reference is made to FIG. 8 showing an exemplary suitable bowl guard as described in U.S. Pat. No. 5,306,083. A front portion 97 of the bowl guard rotates between an open position for access to the bowl and a closed position for mixing operations. A reed-type switch 99 in combination with a magnet 101 that moves with portion 97 of the bowl guard detects when the bowl guard is in the closed position. Other sensor configurations could be used, including a limit switch actuated by physical contact with a portion of the bowl guard.

Referring again to FIG. 4, the control unit 72 controls operation of the SR drive 74. In particular, the timer control 76 communicates with the SR drive 74 via communications bus 100 and also outputs a RUN or STOP directive to the SR drive 74 via path 102. The SR drive 74 can also receive an emergency stop (E-STOP) directive on path 104. The SR drive 74 controls three-phase power delivery to the SR motor 36 and receives a speed indicating feedback signal from a rotary encoder 106 of the motor 36 as well as a temperature feedback signal from a temperature sensor 108. The SR drive 74 also monitors and can control the level of current delivered to the motor 36. Thus, the SR drive 74 provides closed-loop speed and acceleration control of the motor 36, and can prevent motor overload and reduce inrush current during motor starting operations.

In this regard, in one embodiment the timer control 76 includes memory storing a pre-set motor speed corresponding to multiple positions of the switch 88. When the timer control 76 directs the SR drive 74 to begin running the motor 36, the timer control 76 communicates the desired speed to the SR drive 74 via path 100. The SR drive 74 then operates to controllably accelerate the motor 36 from zero rpm to the desired speed, with the controlled acceleration reducing undesired inrush current. Inrush current is a surge of current that can occur when a motor is started, particularly where an attempt is made to immediately drive the motor at the desired final speed. The acceleration is controlled by the SR drive 74 based upon feedback from the encoder 106. Similarly, if the motor is operating at one speed and the speed setting is changed via the user interface 80, the timer control 76 communicates the new speed setting to the SR drive 74 and the SR 74 drive then operates to controllably accelerate or decelerate the motor 36 to the new speed setting. In one embodiment the acceleration may be controlled according to a pre-established acceleration time set in memory of the SR drive 74. In another embodiment the timer control 76 may communicate an acceleration time to the SR drive 74 via path 100. As used herein the term "acceleration time" refers to the amount of time taken to accelerate from one speed to another. In other words, at the start of a mixing operation to occur at a drive motor speed setting of 2500 rpm, if an acceleration time of five seconds is communicated to the SR drive 74, the SR drive responds by accelerating the drive motor 36 from zero rpm to 2500 rpm in the specified 5 seconds. In another embodiment the timer control 76 may communicate an "acceleration rpm value" to the SR drive 74, with the SR drive then operating to accelerate the motor by the acceleration rpm value over a preset time. As an example, where an acceleration rpm value of 100 is delivered to the SR drive 74, the SR drive 74 operates to change the speed of the drive motor by 100 rpm every second, where one second is an exemplary preset time in the SR drive. Memory of the timer control 76 could store a table of acceleration times or acceleration rpm values according to the speed changes being made. Of course, other types acceleration control values could be stored in such a table of memory of the timer control 76 to be communicated by the timer control 76 to the SR drive 74 during speed changes. The combined operation of the control unit 72 and SR drive 74 advantageously enables closed loop control of mixer speed changes on the fly, without having to adjust a gear box or drive linkage ratio.

In addition to communicating desired speed and an acceleration control value to the SR drive 74 when a mix operation is started, the timer control 76 may also communicate a desired current limit to the SR drive 74, where a current limit may also be stored in memory of timer control 76 for each speed. Alternatively, the current limit may be pre-set in memory of the SR drive 74. The SR drive 74 uses the current limit to monitor operation of the motor and can operate to prevent the current delivered to the motor 36 from exceeding the set current limit.

The control system 70 can be used to implement both count down mix operations and count up mix operations. A count down mix operation is one that occurs for a time period that is set by the operator, preferably with the time display 86 displaying a continuously decreasing time remaining for the mix operation. A count up mix operation is one that continues until the operator causes the mix operation to stop (e.g., presses the mix stop button 94) or until some situation, other than time, causes the mix operation to stop (e.g, the bowl is moved out of its operating position or the bowl guard is opened). During the count up mix operation the time display 86 preferably displays a continuously increasing time of the mix operation.

In one embodiment, the timer control 76 includes memory storing a preset mix time for multiple positions of the speed selection switch 88. In other words, when an operator desires to start a mix operation the operator may first utilize speed input mechanism 88 to select the desired speed. When the timer control 76 recognizes the selected speed setting (e.g., position of switch) it responds by accessing from memory a corresponding preset time for that speed setting and drives the display 86 to display the preset time. If that preset time is the time desired by the operator, the operator does not need to set the time. However, if the preset time is not the time desired by the operator, the operator then utilizes the time input mechanism 84 to change the time (e.g., upward or downward). In this case the timer control 76 responsively drives the display 86 to reflect the change. The timer control 76 may also responsively update memory to change the preset mix time for the selected speed setting to the new time input by the operator. In one embodiment the memory update occurs immediately when the operator changes the time, while in another embodiment the memory update only occurs once the mix start button is depressed. Further, where an operator changes mix time during a mixing operation (e.g., during a count down mix operation), the timer control 76 could responsively update memory to change the preset mix time for the selected speed setting to that input by the operator.

As another example of the use of preset mix times for each speed setting, where the mixer is running at a set speed for a certain time (e.g., during a count down type mix operation), if the operator changes the selected speed setting by using speed input mechanism 88, the timer control responsively drives the display 90 to reflect the newly selected speed setting, communicates the new speed setting to SR drive 74 to change the motor speed accordingly and also accesses from memory the preset time corresponding to the newly selected speed setting and drives the display 86 to reflect the accessed preset mix time. The timer control 76 then treats the accessed preset mix time as the new mix time for the count down mix operation. In such an embodiment, changing the speed setting during a count down mixing operation automatically changes the duration of the count down mix.

The control system 70 may also be configured to implement additional control characteristics as desired. For example, when the sensor S1 indicates that the bowl receiving portion 20 is below the raised position and the mix start button 92 is depressed to initiate a mixing operation at a set speed, the control system 70 can responsively operate to only permit operation of the motor 36 at a low speed less than the set speed. If the bowl up/down switch 82 is also depressed to move the bowl receiving portion 20 upward, the control system can responsively operate to actuate the power bowl lift mechanism 54 appropriately at the same time that the motor 36 operates at the low speed. This control characteristic is implemented by the timer control 76 outputting a signal on the BOWL LIFT line, or by otherwise affecting the analog control circuit 78 (e.g., by closing a circuit path in the analog control circuit), to allow forward power (bowl up direction) to be delivered to the power bowl lift mechanism 54; outputting a signal on the TIMER READY line, or otherwise affecting the analog control circuit (e.g., by closing a circuit path in the analog control circuit), to energize a relay that closes contacts to allow power delivery to the motor 36; outputting a run signal to the SR drive 74 on the RUN/STOP line; and communicating the low speed, instead of the set speed, to the SR drive 74 via bus 100. Preferably, this control characteristic is only effected when the bowl guard is in the closed position. Further, this control characteristic is preferably only implemented if the mix start button 92 is continuously depressed and the bowl up/down switch 92 is continuously depressed.

When the bowl receiving portion 20 reaches the raised position the timer control 76 responsively communicates the set speed to the SR drive 74 and the SR drive 74 accelerates the motor from the low speed to the set speed. Further, when the bowl receiving portion 20 reaches the raised position the timer control 76 responsively maintains a run signal to the SR drive 74 on line RUN/STOP without requiring the mix start button to be continuously depressed. According to the described control characteristic, when an operator sets a desired speed and mix time while the bowl is in a lowered position and then simultaneously and continuously presses mix start and bowl raise, the bowl raises and the mixing tool is rotated at a slow speed. The slow rotation of the mixing tool reduces resistance of the food product within the bowl 22 to the insertion of the mixing tool as the bowl is raised. In one embodiment the slow speed may be a slowest speed setting (e.g., STIR) of the mixer or, in another embodiment, may be a speed between the two slowest speed settings. When the bowl 22 and bowl receiving portion 20 reach the raised position as indicated be sensor switch S1, the mix operation proceeds automatically at the higher set speed without requiring further action from the operator. Thus, when the bowl receiving portion 20 is below the raised position the control system 70 only permits operation of the motor 36 at a slow speed, but when the bowl receiving portion 20 is in the raised position the control system 70 permits operation of the motor 36 at any of the available speed settings.

Relative to the bowl guard, the preferred control characteristics based upon bowl guard position are to disable/prevent operation of the drive assembly motor 36 whenever the bowl guard is not in the closed position (e.g., by opening a power delivery path to the motor 36), but to permit the bowl receiving portion 20 to be raised or lowered even when the bowl guard is not in the closed position.

In one embodiment, when the bowl locked sensor S2 indicates the bowl is not in the closed position, the control system 70 prevents the bowl receiving portion and bowl from being raised (e.g., by opening a circuit path in the analog control circuit to prevent delivery of forward power (bowl up direction) to the power bowl lift mechanism 54) and also disables/prevents operation of the drive assembly motor 36, but permits the bowl receiving portion and bowl to be lowered. However, in another embodiment the control system 70 could be configured to permit the bowl receiving portion and bowl to be both raised and lowered even if the bowl is not in the closed position. In still another embodiment, an additional sensor switch could be provided to detect when the bowl receiving portion is located toward the lowest position (e.g., the sensor switch would identify when the bowl receiving portion is in the lower ⅓ of the total movement length between the lowered and raised positions). The control system 70 could then be configured so that (1) when the bowl receiving portion is in the lower region as indicated by the additional sensor switch, the bowl receiving portion is able to move either upward or downward, regardless of whether the bowl is in the closed position, and (2) when the bowl receiving portion is higher than the lower region, the bowl receiving portion is able to move upward only if the bowl is in the closed position and the bowl receiving portion is able to move downward regardless of whether the bowl receiving portion is in the closed position. In both of the latter embodiments, when the bowl is not in the closed position the control system 70 would disable/prevent operation of the drive assembly motor 36.

The described mixing machine may also be provided with one or more special function modes that may be accessible to only certain personnel, such as service personnel. As used herein the terminology "special function mode" refers to any non-mixing mode for the mixing machine. Examples of special function modes include retrieving data log information (e.g. mix hours, total operating hours or fault records) maintained in memory of the timer control 76, changing or setting stored mix speeds corresponding to the positions of the mix speed switch 88, changing or setting stored current limits for the various mix speeds or changing the active model configuration of the mixing machine.

In one embodiment access to each of the special functions requires no more than use of the time input mechanism 84 and/or speed input mechanism 88 of the user interface 80. In particular, the timer control 76 can be configured to look for certain combinations of inputs from one or both mechanisms in order to activate or enter one or more special function modes. Essentially, one or both of the speed input mechanism 88 and the time input mechanism 84 can be used to enter a preset combination or access code (e.g., predetermined sequence of inputs) into the timer control 76, which responds by entering the special function mode. Where multiple special function modes are used, multiple combinations or access codes can be provided, one for each mode. By way of example, an exemplary combination for a special function mode may start with a certain speed switch position (e.g., position 6—the position aligned with display 90), followed by a certain entered time (e.g., 1:24), followed by a different speed switch position (e.g., position 4), followed by another set time (e.g., 1:52), followed by the initial speed switch position (e.g., position 6). The timer control 76 then drives the displays 86 and 90 to display information pertinent to the particular special function mode, and the time input mechanism 84 and speed input mechanism 88 can then be used to retrieve or change information for that particular mode. Where the interface is more advanced, such as in the case of a keypad, the key pad could be used to input the combination.

By way of example, where the mode enables retrieval of fault records, upon entering the special function mode the timer control 76 drives display 86 to display a fault count for a pre-established initial fault condition code. To retrieve information on a next pre-established fault code the speed input mechanism 88 can be turned between certain speed positions, with the timer control 76 responding by driving display 86 to display other fault condition information To leave the special function mode the speed input mechanism 88 could be turned to a certain position (e.g., the STIR speed position).

As another example, where the mode enables resetting of mix speeds, upon entering the special function mode the timer control 76 drives display 86 to display the active mixer model. The operator then turns the speed input mechanism 88 to the speed position for which a change is desired. The timer control 76 responsively drives display 90 to display the selected speed position and drives the time display 86 to display the rpm speed as retrieved from memory for that speed switch position. The operator then rotates the time input mechanism 84 to change the rpm speed. The procedure is repeated for any speed position desired to be changed. To leave the special function mode the speed input mechanism 88 is set to the stir speed position, at which time the newly entered speeds are recorded in memory of the timer control 76. In this regard, the rpm speed corresponding to the stir speed position of mechanism 88 is preferably pre-set and cannot be changed. A similar technique would be used set current limits for each speed if a current limit special function mode were activated.

Another advantageous special function mode enables a mixer model setting to be selected. In this regard, memory of the timer control 76 may store multiple groups of speed settings for multiple mixer model configurations. In the simplest example first and second mixer configurations are provided and the memory stores a first group or plurality of speed settings corresponding to the first mixer model configuration and also stores a second group or plurality of speed settings corresponding to the second mixer model configuration. Only one group of speed settings is active, and therefore available for use, at any one time. When the special function mode for mixer model setting is entered, the timer control 76 drives the time display 86 to display the identity of the active model. To change model settings the speed input mechanism 88 is repeatedly turned between two positions to advance to a next model setting, which is in turn displayed in the time display 86. To leave the special function mode the speed input mechanism 88 is turned to the stir position, and whichever model setting is displayed at that time is made active, meaning the speed settings for that mixer model configuration are made active for subsequent mixing operations.

In another embodiment, a hidden switch might be provided behind an overlay of the user interface 80 for initiating special function modes. Depression of the switch may activate special function modes in a read only format unless a jumper is in place at a particular location in control unit 72, in which case the special function modes could be enabled in a read/write format.

In one embodiment, the timer control 76 stores two different types of speed settings. Referring to FIGS. 1 and 2, the mixer head 16 includes a power take off 200 at the front thereof with an internal drive component 202 that is also driven by the gear system within the head. Such power take offs 200 have been commonly used for years in connection with auxiliary food processing mechanisms, such as vegetable slicers, cheese graters and meat grinders, that are driven by component 202. In the noted embodiment of timer control 76, one or more speed settings are stored for use in connection with mixing operations using the rotatable output component 24 and one or more speed settings are stored for use in connection with devices when attached to power take off 200. This configuration enables an operator to implement both (i) speed settings that have been selected as optimum or desirable for operations using the power take off (e.g., slicing, grating and grinding) and (ii) speed settings that have been selected as optimum or desirable for normal, in-bowl mixing operations. In connection with mixer embodiments configured in this manner, the user interface 80 of FIG. 5 can be configured to effectively communicate these settings to the operator. For example, the specific embodiment shown in FIG. 5 could be altered by replacing the "3" and "4" speed setting designations of the speed switch with designations that read "GRIND" for meat grinding and "SLICE" for vegetable slicing. In such an embodiment speed switch settings "STIR", "1" and "2" would be used by the operator for in-bowl mixing operations, the speed switch setting "GRIND" would be used by the operator when a grinding unit is attached to the power take off 200 and the speed switch setting "SLICE" would be used by the operator when a slicing unit is attached to the power take off 200.

In another embodiment, the control unit 72 may operate with the user interface 80 to display error codes to the operator. For example, if the bowl switch S2 indicates the bowl is not closed and the operator temporarily depresses the mix button 92 in attempt to mix, the control unit 72 can effect display of a close bowl indicator in either of displays 86 and 90 to communicate to the operator the need to pivot the bowl to the closed position in order for normal mixing to be started. Where the displays 86 and 90 are of the LED type, the closed bowl indicator may be a simple indicator such as "bc". Where the displays 86 and 90 are more advanced, the indicator could likewise be more advanced. In another example, if the bowl up sensor S1 indicates the bowl is not in the upward position and the operator temporarily depresses the mix button 92 in attempt to mix, the control unit 72 can effect display of a bowl up indicator (e.g., such as "bu") in either of displays 86 and 90 to communicate to the operator the need to raise the bowl to the upward position in order for normal mixing to be started. If both problems exist when the operator temporarily depresses the mix button 92, the control unit can display the bowl up indicator in one of the displays 86 and 90 and the close bowl indicator in the other display or, in the alternative, the control unit 72 can cause a single one of the displays to alternatingly display both indicators. The displays 86 and 90 could also be used to display other error codes if desired.

Referring now to FIGS. 9-12, a more detailed description of the embodiment including an AC induction motor and variable frequency drive is provided. In particular, user interface 80 is associated with a control system 200 including the variable frequency drive with a rectification section 202 for converting AC input 204 to DC, which is filtered by filter section 206 to remove ripple. The AC input 204 is illustrated as 3-phase but could also be single phase. The filtered DC voltage is input to a switching section 208, illustrated as including 3 transistor half bridge circuits. A control section 210 is connected to control the transistors using PWM signals to produce a 3 phase variable frequency output that is applied to the coil terminals 212 of motor 214. The term 3 phase variable frequency output means that the frequency of the output can be varied if desired to adjust speed, however, during operation of the motor 214 at a set speed the frequency of the output remains substantially constant. Each output takes the form of a PWM voltage signal of varying duty cycle as shown by $V_{AN}$ in FIG. 10, $V_{BN}$ in FIG. 11 and $V_{CN}$ (waveform not shown) for the outputs to the A, B and C terminals 212 of AC induction motor 214. $V_{AN}$ and $V_{BN}$ depict output signals at a set frequency, which would correspond to a certain motor speed. The three waveforms $V_{AN}$, $V_{BN}$ and $V_{CN}$ are identical in frequency and shape, but are phase shifted from each other by one third of a cycle (120°). The effective voltage seen by the A-B motor terminals is shown in FIG. 12 as $V_{AN}$-$V_{BN}$, having a fundamental frequency as represented by the sinusoidal dashed line waveform in FIG. 12. The effective voltage seen by the B-C motor terminals and the C-A motor terminals is similar to FIG. 12, but phase shifted by 120° from each other, thus synthesizing balanced 3 phase waveforms at the motor terminals 212. The fundamental frequency of the effective voltage is varied by the control section 210 by causing the frequency of output signals $V_{AN}$, $V_{BN}$ and $V_{CN}$ to vary in the same way. Because winding inductance filters out the high frequency components of the PWM voltage signals, current in the motor windings will have a frequency that is essentially the same as the fundamental frequency of the voltage as shown in FIG. 12, but will be phase-shifted by approximately 90° due to the inductance of the motor windings. The characteristics of the AC induction motor 214 will generally cause the magnitude of the motor winding current to increase as the load on the AC induction motor 214 increases and the motor 214 begins to slip, thereby providing increased torque when needed. The speed of motor 214 varies according to the fundamental frequency of the synthesized waveforms, and the control 210 can be configured to provide controlled acceleration and deceleration when mix speed changes are made.

In one implementation of a mixer incorporating the control system of FIGS. 9-12, where the mixer is a 20 Qt. mixer, the mixer includes a stir speed and speeds 1, 2 and 3, which speeds may be stored in memory and selected by the interface 80 as previously described. At the highest speed, speed 3, the motor speed may be less than 3500 RPM, and produce a torque of at least 25 in-lb, and the planetary speed may be at least 130 RPM. The planetary speed defines the speed at which the output shaft of the mixer orbits about the center axis of a bowl during mixing. In one example, at the stir speed, the planetary speed may be between 18 and 28 RPM, the motor speed may be between 320 and 500 RPM, and the motor torque is at least 40 in-lb; at speed 1, the planetary speed may be between 36 and 56 RPM, the motor speed may be between 640 and 1000 RPM, and the motor torque is at least 80 in-lb; at speed 2, the planetary speed may be between 70 and 100 RPM, the motor speed may be between 1250 and 1775 RPM, and the motor torque is at least 40 in-lb; and at speed 3 the planetary speed is between 125 and 165 RPM, the motor speed is between 2225 and 2950 RPM, and the motor torque is at least 28 in-lb.

In another implementation of a mixer incorporating the control system of FIGS. 9-12, where the mixer is a 60 quart mixer, at the highest speed, speed 3, the motor speed may be less than 1500 RPM, and produce a torque of at least 165 in-lb, and the planetary speed may be at least 60 RPM. In one example, at speed 1, the planetary speed may be between 20 and 30 RPM, the motor speed may be between 500 and 750 RPM, and the motor torque is at least 175 in-lb; at speed 2, the planetary speed may be between 26 and 36 RPM, the motor speed may be between 650 and 900 RPM, and the motor torque is at least 135 in-lb; and at speed 3 the planetary speed is between 35 and 50 RPM, the motor speed is between 875 and 1250 RPM, and the motor torque is at least 170 in-lb. A slower stir speed may also be provided.

In another implementation of a mixer incorporating the control system of FIGS. 9-12, where the mixer is a 140 quart mixer, at the highest speed, speed 3, the motor speed may be less than 2500 RPM, and produce a torque of at least 320 in-lb, and the planetary speed may be at least 80 RPM. In one example, at speed 1, the planetary speed may be between 21 and 31 RPM, the motor speed may be between 525 and 775 RPM, and the motor torque is at least 690 in-lb; at speed 2, the planetary speed may be between 40 and 52 RPM, the motor speed may be between 1000 and 1300 RPM, and the motor torque is at least 450 in-lb; and at speed 3 the planetary speed is between 80 and 95 RPM, the motor speed is between 2000 and 2375 RPM, and the motor torque is at least 300 in-lb. A slower stir speed may also be provided.

Other implementations using the control system of FIGS. 9-12 are possible.

It is to be clearly understood that the above description is intended by way of illustration and example only and is not intended to be taken by way of limitation. Other changes and modifications could be made, including both narrowing and broadening variations and modifications of the appended claims.

What is claimed is:

1. A mixing machine, comprising:
   a head extending over a bowl receiving location, the head including a rotatable output shaft for receiving a mixer tool, the head including a gear system therewithin for effecting rotation of the rotatable output shaft about its axis and orbiting of the shaft axis about another axis;

an AC induction motor having an output operatively connected to drive the gear system;

a drive for operating the AC induction motor, the drive including a rectification section for converting input AC power to DC power and a switching section for producing a 3 phase variable frequency output that is applied to the AC induction motor, wherein the switching section is controlled to adjust frequency of the 3 phase variable frequency output to make mix speed changes on the fly solely by adjusting speed of the AC induction motor;

a user interface including at least one speed input mechanism having a limited number of speed positions;

the drive is part of a control system including memory storing a plurality of distinct mix speeds corresponding to the speed positions of the speed input mechanism;

wherein at one mix speed of the plurality of distinct mix speeds the motor speed is between about 2225 and 2950 RPM and the planetary speed is between about 125 and 165 RPM, and at a slower mix speed of the plurality of distinct mix speeds the motor speed is between about 320 and 500 RPM and the planetary speed is between about 18 and 28 RPM.

2. The mixing machine of claim 1 wherein the drive operates to control acceleration when changing from one mix speed to another.

3. The mixing machine of claim 1 wherein the switching section is controlled by a plurality of PWM control signals.

4. The mixing machine of claim 1 wherein a maximum speed of an output shaft of the AC induction motor for a highest of the plurality of mix speeds is less than 3500 RPM.

5. The mixing machine of claim 1 wherein the 3 phase variable frequency output comprises first, second and third PWM voltage signals.

6. The mixing machine of claim 1 wherein the AC induction motor has at least six poles.

7. A mixing machine, comprising:

a head extending over a bowl receiving location, the head including a rotatable output shaft for receiving a mixer tool, the head including a gear system therewithin for effecting rotation of the rotatable output shaft about its axis and orbiting of the shaft axis about another axis;

an AC induction motor having an output operatively connected to drive the gear system;

a drive for operating the AC induction motor, the drive including a rectification section for converting input AC power to DC power and a switching section for producing a 3 phase variable frequency output that is applied to the AC induction motor, wherein the switching section is controlled to adjust frequency of the 3 phase variable frequency output to make mix speed changes on the fly solely by adjusting speed of the AC induction motor;

a user interface including at least one speed input mechanism having a limited number of speed positions;

the drive is part of a control system including memory storing a plurality of distinct mix speeds corresponding to the speed positions of the speed input mechanism;

wherein at one mix speed of the plurality of distinct mix speeds the motor speed is between about 875 and 1250 RPM and the planetary speed is between about 35 and 50 RPM, and at a slower mix speed of the plurality of distinct mix speeds the motor speed is between about 500 and 750 RPM and the planetary speed is between about 20 and 30 RPM.

* * * * *